United States Patent
Tsujimoto

(10) Patent No.: US 8,347,608 B2
(45) Date of Patent: Jan. 8, 2013

(54) EXHAUST GAS PURIFICATION SYSTEM FOR AN INTERNAL COMBUSTION ENGINE

(75) Inventor: Kenichi Tsujimoto, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 811 days.

(21) Appl. No.: 12/448,103

(22) PCT Filed: Jun. 5, 2008

(86) PCT No.: PCT/JP2008/060721
§ 371 (c)(1),
(2), (4) Date: Jun. 9, 2009

(87) PCT Pub. No.: WO2008/150019
PCT Pub. Date: Dec. 11, 2008

(65) Prior Publication Data
US 2010/0132336 A1 Jun. 3, 2010

(30) Foreign Application Priority Data
Jun. 8, 2007 (JP) .................................. 2007-153183

(51) Int. Cl.
*F01N 3/00* (2006.01)
*F01N 3/10* (2006.01)
*F02B 27/02* (2006.01)

(52) U.S. Cl. ................ 60/286; 60/287; 60/291; 60/292; 60/303; 60/312

(58) Field of Classification Search .................... 60/281, 60/286, 287, 291, 292, 295, 301, 303, 312
See application file for complete search history.

(56) References Cited

U.S. PATENT DOCUMENTS

| 5,404,717 A | 4/1995 | Nogi et al. | |
| 6,568,178 B2 * | 5/2003 | Hirota et al. | 60/297 |
| 2003/0014966 A1 * | 1/2003 | Hirota et al. | 60/284 |
| 2006/0107653 A1 | 5/2006 | Nakatani | |
| 2008/0016855 A1 * | 1/2008 | Kogo et al. | 60/295 |

FOREIGN PATENT DOCUMENTS

| EP | 1662107 A1 * | 5/2006 |
| JP | A-05-240131 | 9/1993 |
| JP | A-11-159320 | 6/1999 |
| JP | 11294145 A * | 10/1999 |
| JP | A-2004-308549 | 11/2004 |
| JP | A-2005-120938 | 5/2005 |
| WO | WO 2007/063378 A2 | 6/2007 |

OTHER PUBLICATIONS

Tawara, Machine Translation of JP 11-294145 A, Oct. 26, 1999.*
Tawara, English Abstract of JP 11-294145 A, Oct. 26, 1999.*

* cited by examiner

*Primary Examiner* — Kenneth Bomberg
*Assistant Examiner* — Audrey K Bradley
(74) *Attorney, Agent, or Firm* — Oliff & Berridge, PLC

(57) ABSTRACT

A degree of dispersion of a reducing agent added to an exhaust gas flowing into an exhaust gas purification apparatus is controlled. Before addition fuel is added, a valve opening Vd of a flow area changing valve is changed to generate pulsation of the exhaust gas, so that addition valve vicinity exhaust gas pressure Pg varies periodically. Addition timing TMad is controlled to synchronize with extremum arrival timing TMe. High or low dispersion type addition control adds fuel at timing (CP) when the addition valve vicinity exhaust gas pressure Pg becomes a maximum value Pgmax, at timing (TP) when at a minimum value Pgmin, or at both timings (CP, TP).

13 Claims, 6 Drawing Sheets

EXHAUST GAS PURIFICATION SYSTEM FOR AN INTERNAL COMBUSTION ENGINE

This application is the national phase application under 35 U.S.C. §371 of PCT international application No. PCT/JP2008/060721 filed on 5 Jun. 2008, which claims priority to Japanese patent application No. 2007-153183 filed on 8 Jun. 2007, the contents of which are incorporated herein by reference.

TECHNICAL FIELD

The present invention relates to an exhaust gas purification system for an internal combustion engine.

BACKGROUND ARTS

Exhaust gases discharged from internal combustion engines include harmful or toxic substances such as NOx. It is known that an NOx storage reduction catalyst (hereinafter referred to as an NOx catalyst) is provided to decrease an amount of these toxic substances to be discharged. In this technique, as the purification capacity or performance of the NOx catalyst decreases in accordance with an increasing amount of NOx stored therein, a reducing agent is generally supplied to the NOx catalyst, so that the NOx stored in the NOx catalyst can be thereby reduced and released therefrom (hereinafter referred to as "NOx reduction process").

Further, in order to eliminate SOx poisoning in which SOx in an exhaust gas is stored into the NOx catalyst to lower the purification performance thereof, the bed temperature of the NOx catalyst may sometimes be made higher, and at the same time a reducing agent may be supplied to the NOx catalyst (hereinafter referred to as "SOx poisoning recovery process"). In this SOx poisoning recovery process, the reducing agent is also used for the purpose of raising the bed temperature of the NOx catalyst.

In addition, the exhaust gases of the internal combustion engines also include particulate matter (PM) that contains carbon as a major component. In order to prevent the particulate matter from being released to the ambient atmosphere, there has been known a technique in which a particulate filter (hereinafter referred to simply as a "filter") for trapping particulate matter is provided on an exhaust system of an internal combustion engine.

In such a filter, as an amount of accumulation of the particulate matter trapped increases, back pressure in the exhaust gas is raised due to a clogging of the filter, resulting in decreased engine performance. Thus, in order to prevent this, the temperature of the filter is often made higher, whereby the particulate matter trapped in the filter can be oxidized and removed (hereinafter referred to as "PM regeneration process"). In this case, too, fuel, which serves as a reducing agent, may sometimes be supplied to the filter so as to increase the temperature thereof.

As a method for supplying a reducing agent to an exhaust gas purification apparatus as stated above, there has been well known one in which a reducing agent addition valve is arranged on an exhaust passage at a location upstream of the exhaust gas purification apparatus, so that a reducing agent such as for example liquid fuel can be added to an exhaust gas in the exhaust passage by means of the reducing agent addition valve. Here, note that if the reducing agent addition valve is arranged immediately upstream of the exhaust gas purification apparatus, there will be a fear that the liquid fuel added from the reducing agent addition valve to the exhaust gas might flow into the exhaust gas purification apparatus before the liquid fuel has dispersed in an appropriate manner. As a result, the reducing agent might not sometimes be supplied to the entire exhaust gas purification apparatus in a uniform manner.

In relation to this, Japanese patent application laid-open No. 2004-308549 discloses a technique in which a part of exhaust gas is subjected to pressure application to generate a pressurized exhaust gas, which is supplied to the exhaust gas together with fuel added by a fuel addition unit. In this technique, the fuel is atomized or vaporized by controlling the timing at which the pressurized exhaust gas is to be supplied and the timing at which the fuel is to be added in synchronization with each other. In this technique, however, it is necessary to pressurize the exhaust gas by means of an air pump or the like, so the system construction of the fuel addition unit might become complicated, thus providing a hindrance to the reduction of costs.

In addition, Japanese patent application laid-open No. H5-240131 discloses a technique in which fuel being injected from a fuel injection valve into an intake pipe is atomized by the use of a stream of air supplied by an air pump. In this technique, the fuel is injected from the fuel injection valve in such a manner as to synchronize with the pulsation of the assist air.

Also, Japanese patent application laid-open No. H11-159320 discloses an exhaust gas purification apparatus for an internal combustion engine which is provided with a baffle plate that is rotating while shielding a part of an inflow surface of an exhaust gas flowing into an NOx catalyst, and a reducing agent supplying unit that injects a reducing agent to a shielding portion of the baffle plate in succession in synchronization with the rotation of the baffle plate.

Moreover, Japanese patent application laid-open No. 2005-120938 discloses an exhaust gas purification apparatus for an internal combustion engine which is provided with a first exhaust path and a second exhaust path that are branched from an exhaust passage at a location downstream of a reducing agent supplying unit, and a change-over valve that is able to change over a path through which an exhaust gas flows into the first exhaust path or the second exhaust path.

In this technique, the timing at which a reducing agent is supplied by the reducing agent supply unit is synchronized with the timing at which the path through which the exhaust gas flows is changed over by the change-over valve.

In the NOx reduction process or the SOx poisoning recovery process, however, it is necessary to control the air fuel ratio of an exhaust gas flowing into an NOx catalyst to be a rich air fuel ratio. Accordingly, by supplying an exhaust gas containing a high concentration of a reducing agent to the NOx catalyst (i.e., by deepening or increasing a rich spike), a locally deep rich atmosphere is sometimes intended to be formed in the NOx catalyst, thereby making it possible to improve the reduction efficiency of NOx and/or SOx.

However, in the techniques disclosed in the above-mentioned publications, even if the degree of dispersion of a reducing agent added to an exhaust gas could be raised, it would be difficult to form a locally deep rich atmosphere in an NOx catalyst. Accordingly, a technique has been desired which is able to control the degree of dispersion of a reducing agent added to an exhaust gas flowing into an exhaust gas purification apparatus in accordance with the content of process (e.g., NOx reduction process, SOx poisoning recovery process, PM regeneration process, etc.) to be performed on the exhaust gas purification apparatus with a simple construction.

DISCLOSURE OF THE INVENTION

The present invention has been made in view of the above-mentioned problems, and has for its object to provide a technique which is capable of controlling the degree of dispersion of a reducing agent added to an exhaust gas flowing into an exhaust gas purification apparatus when reducing agent addition control for adding the reducing agent to the exhaust gas flowing into the exhaust gas purification apparatus is performed.

In order to achieve the above object, an exhaust gas purification system for an internal combustion engine according to the present invention is characterized by adopting an exhaust gas purification apparatus that is arranged on an exhaust passage of the internal combustion engine for purifying an exhaust gas passing through said exhaust passage, a reducing agent addition unit that is arranged on said exhaust passage at a location upstream of said exhaust gas purification apparatus for adding a reducing agent to the exhaust gas passing through said exhaust gas purification apparatus, a flow area changing unit that is arranged on said exhaust passage for changing a flow area thereof for the exhaust gas, a pulsation generation unit that generates pulsation of the exhaust gas by changing said flow area by means of said flow area changing unit before said reducing agent addition unit adds the reducing agent to the exhaust gas, and an addition timing control unit that controls said reducing agent addition unit so as to add the reducing agent at timing at which the exhaust gas pressure in the vicinity of said reducing agent addition unit, being varied or fluctuated due to said pulsation of the exhaust gas, becomes in the vicinity of a maximum value and/or a minimum value.

Specifically, in the present invention, when reducing agent addition control is performed in which the reducing agent is added from the reducing agent addition unit to the exhaust gas, the exhaust gas passing through the exhaust passage is caused to pulsate by changing the flow area for the exhaust gas by means of the flow area changing unit before the addition of the reducing agent to the exhaust gas. The pulsation of the exhaust gas is a periodic pressure variation or fluctuation that occurs at the time or because of a change in the flow resistance of the exhaust gas passing in the exhaust passage. In the present invention, the flow area changing unit can increase or decrease the flow area for the exhaust gas. In any case, the flow resistance of the exhaust passage changes at the time when the exhaust gas passes through the exhaust passage, so that the above-mentioned pulsation of the exhaust gas can be thereby generated.

In addition, when the pressure variation or fluctuation is generated due to the pulsation of the exhaust gas, the density of the exhaust gas rises in the course of the rising exhaust pressure, and at the timing when the exhaust gas pressure becomes the maximum value, the density of the exhaust gas also becomes a maximum. During the time when the exhaust gas pressure is decreasing after having reached the maximum value, the density of the exhaust gas decreases, and at the timing when the exhaust gas pressure becomes the minimum value, the density of the exhaust gas also becomes a minimum. In the present invention, the reducing agent addition unit is controlled to add the reducing agent at the timing when the exhaust gas pressure in the vicinity of the reducing agent addition unit (hereinafter also referred to simply as "the exhaust gas pressure") becomes in the vicinity of the maximum value (hereinafter referred to as "the crest of pulsation") and/or the minimum value (hereinafter referred to as "the trough of pulsation").

According to the present invention, by adding the reducing agent at the timing when the exhaust gas pressure, being varied due to the pulsation of the exhaust gas, becomes in the vicinity of the maximum value (i.e., in the vicinity of the crest of pulsation), the reducing agent collides with the exhaust gas of high density, thereby making it possible to facilitate the atomization of the reducing agent. As a result, the dispersiveness of the reducing agent added to the exhaust gas can be improved so that the exhaust gas in which the degree of dispersion of the reducing agent has become higher can be supplied to the exhaust gas purification apparatus. In other words, the reducing agent can be supplied to the entire exhaust gas purification apparatus more uniformly. Here, the degree of dispersion of the reducing agent is a concept to indicate the extent of how the reducing agent disperses in the exhaust gas. Also, the more the dispersiveness of the reducing agent is improved, there can be formed an exhaust gas with the higher degree of dispersion of the reducing agent.

In addition, when the reducing agent is added to the exhaust gas at the timing when the exhaust gas pressure becomes the minimum value (the trough of pulsation), i.e., when the exhaust gas becomes low density, the atomization of the reducing agent is suppressed. As a result, locations at which the concentration of the reducing agent becomes locally high and low will be unevenly distributed in the exhaust gas. In other words, by locally supplying as much an amount of reducing agent as possible to a portion of the exhaust gas purification apparatus, it is possible to form a deep rich atmosphere in that portion. Here, note that the "deep rich atmosphere" includes the meaning that the air fuel ratio of the exhaust gas passing through the exhaust gas purification apparatus is a much richer air fuel ratio, or the meaning that the oxygen concentration of the exhaust gas is a much lower concentration.

As described above, according to the present invention, it is selected whether the reducing agent is added to the exhaust gas either at the timing when the exhaust gas pressure is in the vicinity of the maximum value or at the timing when the exhaust gas pressure is in the vicinity of the minimum value. According to this, the reducing agent can be supplied to the exhaust gas purification apparatus by freely selecting whether to raise or lower the degree of dispersion of the reducing agent in the exhaust gas flowing into the exhaust gas purification apparatus.

Moreover, according to the present invention, the reducing agent can be added both at the timing when the exhaust pressure becomes in the vicinity of the maximum value, and at the timing when the exhaust gas pressure becomes in the vicinity of the minimum value. With this, it is possible to enjoy both of the following merits. That is, the reducing agent can be supplied to the entire exhaust gas purification apparatus in a more uniform manner, and a locally deep rich atmosphere can be formed in the exhaust gas purification apparatus.

Further, in the present invention, it is possible to raise and lower the degree of dispersion of the reducing agent with the same construction, so the dispersive property of the reducing agent can be controlled with a simple construction. Accordingly, the exhaust gas purification system can be made compact and reduced in cost.

Here, note that the term "vicinity" in the vicinity of the maximum value (or in the vicinity of the minimum value) of the exhaust gas pressure includes, of course, the maximum value (or minimum value) of the exhaust gas pressure and values near (before and after) that value, but the range of the above-mentioned vicinity can instead be determined beforehand by experiments or the like. For example, the range of the above-mentioned "vicinity" can be determined in such a manner that the effect of raising (or lowering) the degree of dispersion in the exhaust gas of the reducing agent is not deteriorated to an excessive extent in case where the reducing agent is added before or after the exhaust gas pressure reaches the maximum value (or the minimum value), as compared with the case where the reducing agent is added at the instant when the exhaust gas pressure reaches the maximum value (or the minimum value).

Here, the pulsation of the exhaust gas generated due to the change in the flow area of the exhaust gas attenuates gradually. That is, the variation width or range of the exhaust gas pressure (e.g., the absolute value of a difference between the maximum value (the crest of the pulsation) and minimum value (the trough of the pulsation) at the time when the exhaust gas pressure varies or fluctuates becomes substantially a maximum immediately after the generation of the pulsation, and thereafter decreases gradually. In other words, the pulsation of the exhaust gas is gradually "annealed (or decreased)" with the passage of time.

Accordingly, after the variation range of the exhaust gas pressure has become excessively small, the operational effect of the present invention might be alleviated even if the reducing agent is added to the exhaust gas at the timing when the exhaust gas pressure becomes in the vicinity of the maximum value or the minimum value. That is, it might sometimes become difficult to appropriately control the degree of dispersion of the reducing agent in the exhaust gas, such as the uniform supplying of the reducing agent to the entire exhaust gas purification apparatus due to the addition of the reducing agent at the timing when the exhaust gas pressure is in the vicinity of the maximum value, or the formation of a locally deep rich atmosphere in the exhaust gas purification apparatus due to the addition of the reducing agent at the timing when the exhaust gas pressure is in the vicinity of the minimum value, etc.

Accordingly, in the present invention, the addition timing control unit can control the reducing agent addition unit so as to add the reducing agent within the range of a period in which the variation range of the exhaust gas pressure is maintained equal to or greater than a predetermined allowable variation range. Here, note that the predetermined allowable variation range is a lower limit value of the variation range of the exhaust gas pressure that can control the degree of dispersion of the reducing agent in an appropriate manner when the reducing agent is added to the exhaust gas in the vicinity of the maximum value and/or the minimum value of the exhaust gas pressure.

According to this construction, the degree of dispersion of the reducing agent in the exhaust gas can be controlled in an appropriate manner by adding the reducing agent to the exhaust gas at the timing when the exhaust gas pressure becomes in the vicinity of the maximum value and/or the minimum value within the range of a period in which the variation range of the exhaust gas pressure is maintained equal to or more than the predetermined allowable variation range. In addition, the reducing agent can be added within a period of time in which it is possible to control the degree of dispersion of the reducing agent in an easy manner.

In addition, the degree of dispersion of the reducing agent is changed according to the level of density of the exhaust gas. Therefore, when the reducing agent is added at the timing at which the exhaust gas pressure becomes in the vicinity of the maximum value, it is necessary to maintain the maximum value of the exhaust gas pressure higher to some extent than the value of the exhaust gas pressure immediately before the flow area changing unit changes the flow area of the exhaust gas (hereinafter also referred to as an "initial exhaust gas pressure"). Similarly, when the reducing agent is added at the timing at which the exhaust gas pressure becomes in the vicinity of the minimum value, it is necessary to maintain the minimum value of the exhaust gas pressure lower to some extent than the initial exhaust gas pressure.

Accordingly, in the present invention, when controlling the reducing agent addition unit so as to add the reducing agent to the exhaust gas at the timing at which the exhaust gas pressure becomes in the vicinity of the maximum value, the addition timing control unit can add the reducing agent within the range of a period in which the maximum value is maintained higher, by a first threshold or more, than the exhaust gas pressure immediately before the flow area is changed (the initial exhaust gas pressure). The predetermined first threshold means a lower limit value of a difference between the initial exhaust gas pressure and the maximum value, which is able to raise or increase the degree of dispersion of the reducing agent when the reducing agent is added to the exhaust gas in the vicinity of the maximum value of the exhaust gas pressure. According to this, the reducing agent can be added within a period of time in which it is possible to raise the degree of dispersion of the reducing agent in an easy manner.

Moreover, when controlling the reducing agent addition unit so as to add the reducing agent to the exhaust gas at the timing at which the exhaust gas pressure becomes in the vicinity of the minimum value, the addition timing control unit can add the reducing agent within the range of a period in which the minimum value is maintained lower, by a second threshold or more, than the exhaust gas pressure immediately before the flow area is changed (the initial exhaust gas pressure). The predetermined second threshold means a lower limit value of a difference between the initial exhaust gas pressure and the minimum value, which is able to lower or decrease the degree of dispersion of the reducing agent when the reducing agent is added to the exhaust gas in the vicinity of the minimum value of the exhaust gas pressure. According to this, the reducing agent can be added within a period of time in which it is possible to lower the degree of dispersion of the reducing agent in an easy manner.

Here, the above-mentioned allowable variation range, the first threshold and the second threshold can be set as fixed values, or can be obtained beforehand in accordance with an operating state of the internal combustion engine by experiments or the like so as to provide a desired degree of dispersion. For example, a map can be constructed in which a relation among the initial exhaust gas pressure, the allowable variation range, the first threshold and the second threshold is stored.

Here, note that the exhaust gas purification apparatus according to the present invention can include a catalyst having oxidizing ability, and can perform temperature raising control in which a reducing agent is supplied to the catalyst having oxidizing ability thereby to raise the temperature of the exhaust gas purification apparatus. That is, the temperature of the exhaust gas purification apparatus can be raised due to the heat of reaction that is generated when the reducing agent supplied to the catalyst having oxidizing ability is oxidized. In that case, in the present invention, the addition timing control unit can control the reducing agent addition unit so as to add the reducing agent at the timing when the exhaust gas pressure becomes in the vicinity of the maximum value. Hereinafter, the control that adds the reducing agent at the timing when the exhaust gas pressure becomes in the vicinity of the maximum value is called "high dispersion type addition control".

According to this, the degree of dispersion of the reducing agent added to the exhaust gas is increased, so the reducing agent can be supplied to the entire catalyst having oxidizing ability in a uniform manner. As a result, the temperature of the exhaust gas can be caused to rise more efficiently, whereby the exhaust gas purification apparatus can be raised in temperature in an appropriate manner. Here, the exhaust gas purification apparatus can be constructed to include a filter that serves to trap particulate matter (PM) in the exhaust gas. In this case, when PM regeneration process is performed in which the PM trapped in the filter is oxidized and removed by raising the temperature of the filter, it is preferable to execute the high dispersion type addition control. According to the high dispersion type addition control, the exhaust gas purification apparatus (i.e., the filter) can be raised in temperature more efficiently. Therefore, the oxidation removal of the particulate matter can be carried out in an efficient manner.

Further, the exhaust gas purification apparatus according to the present invention can include an NOx catalyst, and can execute NOx reduction process or SOx poisoning recovery process by supplying a reducing agent to the NOx catalyst.

For example, the degree of dispersion of the reducing agent added to the exhaust gas can be increased by performing the high dispersion type addition control, so the reducing agent can be supplied to the entire NOx catalyst in a more uniform manner. As a result, the NOx and SOx stored in the NOx catalyst can be reduced in a uniform manner.

Furthermore, when the above-mentioned NOx reduction process or SOx poisoning recovery process is carried out, the control that adds the reducing agent at the timing at which the exhaust gas pressure becomes in the vicinity of the minimum value (hereinafter referred to as "low dispersion type addition control") can be done. According to this, a locally deep rich atmosphere can be formed in the exhaust gas purification apparatus. Therefore, the NOx or SOx reduction efficiency in a specific portion of the exhaust gas purification apparatus can be particularly improved. In addition, the control that is achieved by a combination of the high dispersion type addition control and the low dispersion type addition control can be carried out. According to such control, it is possible to supply the reducing agent to the entire NOx catalyst in a uniform manner, and to form a locally deep rich atmosphere therein. Therefore, the NOx and SOx stored in the NOx catalyst can be reduced in a more appropriate manner.

Here, when the pulsation of the exhaust gas is generated, the pressure variation or fluctuation of the exhaust gas pressure is repeated in a periodic manner, so the maximum value (the crest of the pulsation) and the minimum value (the trough of the pulsation) will appear alternately in the exhaust gas pressure. In view of this, in this invention, the addition timing control unit can control the reducing agent addition unit so as to intermittently add the reducing agent, and at the same time to synchronize the addition timing, at which the reducing agent is added by the reducing agent addition unit, with the timing at which the exhaust gas pressure becomes in the vicinity of the maximum value and/or the minimum value.

Here, note that the reducing agent can be added at all the timing at which the exhaust gas pressure becomes in the vicinity of the maximum value and the minimum value, but the present invention is not intended to be limited to this, and various variations thereof can be adopted.

For example, the reducing agent can be added in synchronization with only the timing at which the exhaust gas pressure becomes in the vicinity of the maximum value. According to this, high dispersion type addition control with the highest priority given to the dispersiveness of the reducing agent added to the exhaust gas is able to be executed. In other words, the temperature raising of the exhaust gas purification apparatus or the PM regeneration process can be carried out in an appropriate manner, as in the above examples. Also, in this case, the reducing agent need not necessarily be added at all the timing at which the exhaust gas pressure becomes in the vicinity of the maximum value.

In addition, the reducing agent can be added in synchronization with only the timing at which the exhaust gas pressure becomes in the vicinity of the minimum value. According to this, low dispersion type addition control with the formation of a locally deep rich atmosphere being given higher priority than the dispersiveness of the reducing agent added to the exhaust gas is able to be executed. As a result, for example, the NOx reduction process and SOx poisoning recovery process on the NOx catalyst can be executed in an efficient manner. In this case, too, the reducing agent need not necessarily be added at all the timing at which the exhaust gas pressure becomes in the vicinity of the minimum value.

Moreover, the reducing agent can be added in synchronization with both the timing at which the exhaust gas pressure becomes in the vicinity of the maximum value, and the timing at which the exhaust gas pressure becomes in the vicinity of the minimum value. According to this, it is able to achieve both of more uniform supplying of the reducing agent to the entire exhaust gas purification apparatus, and formation of a locally deep rich atmosphere in the exhaust gas purification apparatus.

Further, in the exhaust gas purification system for an internal combustion engine according to the present invention, provision can be further made for an addition timing decision unit that acquires extremum arrival timing at which the exhaust gas pressure varying with the pulsation of the exhaust gas becomes in the vicinity of the maximum value and/or the minimum value, and at the same time decides, based on the extremum arrival timing thus acquired, addition timing at which the reducing agent addition unit is controlled to add the reducing agent by means of the addition timing control unit.

For example, the addition timing decision unit can have a pressure sensor for detecting the exhaust gas pressure in the vicinity of the reducing agent addition unit, and can acquire, based on the detected value of this pressure sensor, the extremum arrival timing, i.e., the timing at which the exhaust gas pressure becomes in the vicinity of the maximum value and/or the minimum value.

Alternatively, the change of the exhaust gas pressure, which is varied or fluctuated after the generation of pulsation (after the flow area changing unit has changed the flow area for the exhaust gas), can be obtained beforehand for each operating state of the internal combustion engine by experiments or the like. In addition, the extremum arrival timing can be acquired based on a control map in which a relation between an elapsed time after the generation of pulsation and the exhaust gas pressure is stored.

With this, it is possible to acquire, with high accuracy, the extremum arrival timing that appears in a periodic manner after the pulsation generation unit has generated the pulsation of the exhaust gas. Accordingly, the addition timing of the reducing agent can be decided as more appropriate timing so as to control the dispersiveness of the reducing agent.

Here, note that in the present invention, the flow area changing unit for changing the flow area of the exhaust passage can be a flow control valve that serves to control the flow rate of the exhaust gas. By increasing (or decreasing) the degree of opening of the flow control valve, the flow resistance to the exhaust gas can be changed, thus making it possible to generate the pulsation of the exhaust gas in an appropriate manner.

Here, the pulsation of the exhaust gas generated by the pulsation generation unit propagates in the exhaust passage. Thus, even if the reducing agent addition unit is disposed at the upstream side or at the downstream side of the flow area changing unit (e.g., a flow control valve), the exhaust gas pressure in the vicinity of the reducing agent addition unit can be caused to vary in an appropriate manner.

Accordingly, the reducing agent addition unit in the present invention can be arranged on the exhaust passage at the downstream side of the flow area changing unit or at the upstream side of the flow area changing unit. According to either of the above arrangements, it is possible to control the degree of dispersion of the reducing agent added to the exhaust gas flowing into the exhaust gas purification apparatus.

Here, focusing attention on the variation range of the exhaust gas pressure when the pulsation of the exhaust gas is generated, the larger the variation range of the exhaust gas pressure (i.e., the higher the maximum value of the exhaust gas pressure, and the lower the minimum value of the exhaust gas pressure), the more the controllability of the degree of dispersion of the reducing agent can be improved. In addition, the variation range of the exhaust gas pressure at the time when the pulsation of the exhaust gas is generated becomes larger in the exhaust passage at the upstream side of the flow area changing unit than at the downstream side of the flow area changing unit.

Accordingly, it is preferable that the reducing agent addition unit be arranged on the exhaust passage at the upstream side of the flow area changing unit. With such an arrangement, it is possible to increase the variation range of the exhaust gas pressure in the vicinity of the reducing agent addition unit to a much more extent.

In other words, when the reducing agent is added at the timing at which the exhaust gas pressure becomes in the vicinity of the maximum value, it is possible to add the reducing agent at a much higher density of the exhaust gas. Accordingly, the dispersiveness of the reducing agent can be made much higher. On the other hand, when the reducing agent is added at the timing at which the exhaust gas pressure becomes in the vicinity of the minimum value, the addition of the reducing agent can be done at a much lower density of the exhaust gas. Accordingly, a deeper rich atmosphere can be formed in the exhaust gas purification apparatus. In other words, the degree of dispersion of the reducing agent can be controlled more efficiently.

The above and other objects, features and advantages of the present invention will become more readily apparent to those skilled in the art from the following detailed description of preferred embodiments of the present invention taken in conjunction with the accompanying drawings.

DESCRIPTION OF THE PREFERRED EMBODIMENT

Now, preferred embodiments of the present invention will be described below in detail while referring to the accompanying drawings. Here, it is to be understood that the measurements, materials, shapes, relative arrangements and the like of component parts described in the following embodiments are only illustrative but should not be construed as limiting the technical scope of the present invention in any manner, in particular unless specified otherwise.

(Embodiment 1)

Figure 1:
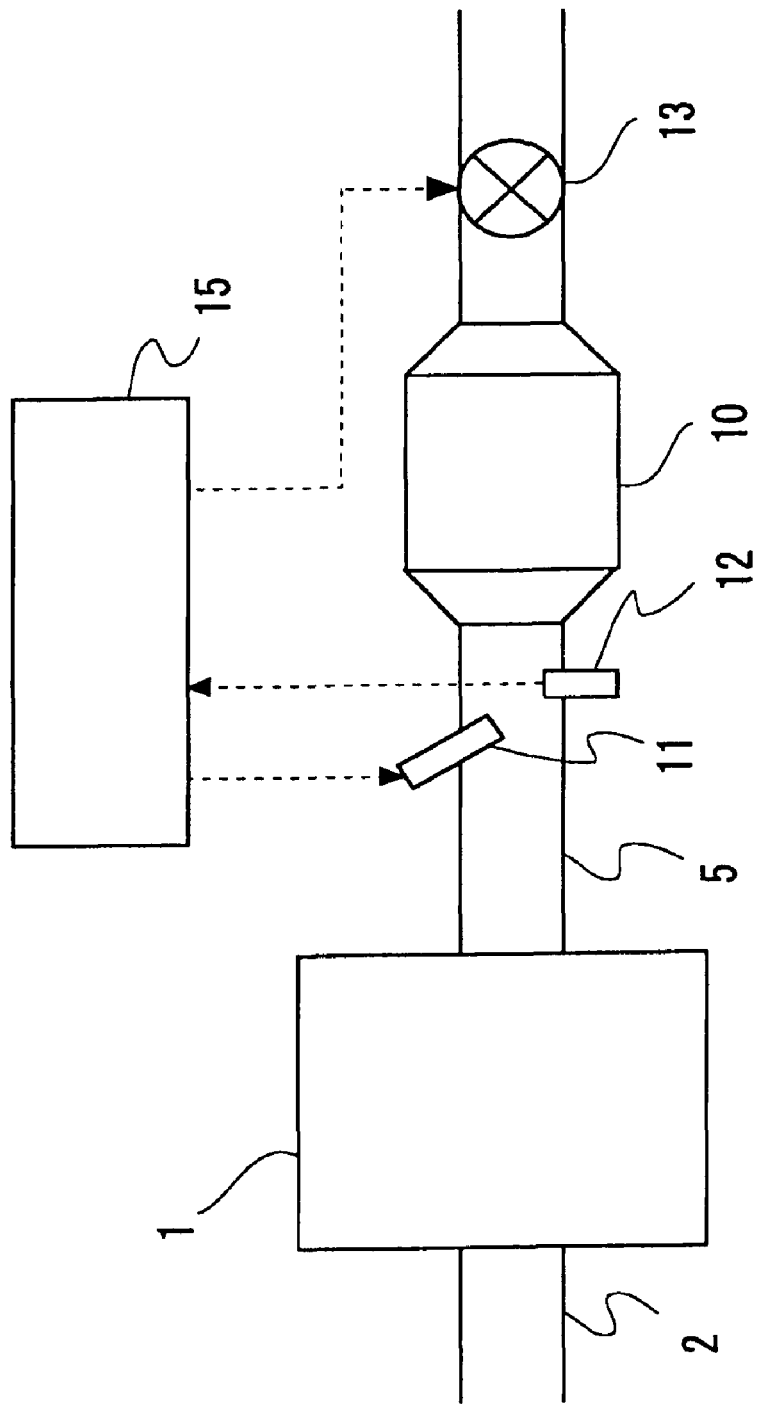
FIG. 1 is a view showing the schematic construction of an internal combustion engine with its intake and exhaust systems and a control system according to a first embodiment of the present invention.

Referring to the drawings and first to FIG. 1, there is shown the schematic construction of an internal combustion engine with its intake and exhaust systems and a control system according to a first embodiment of the present invention. The internal combustion engine, generally denoted at reference numeral 1 as illustrated in FIG. 1, is a diesel engine. Here, note that in FIG. 1, the interior of the internal combustion engine 1 is omitted.

An intake passage 2 and an exhaust passage 5 are connected with the internal combustion engine 1. On the exhaust passage 5, there is arranged a DPNR (Diesel PM and NOx Reduction) unit 10 in which an NOx storage reduction catalyst (hereinafter referred to simply as an "NOx catalyst") is carried by a particulate filter that serves to trap particulate matter in an exhaust gas. In this embodiment, the DPNR unit 10 corresponds to an exhaust gas purification apparatus in the present invention, and the NOx catalyst carried by the DPNR unit 10 corresponds to a catalyst having oxidizing ability or function in the present invention.

On the exhaust passage 5 at an upstream side of the DPNR unit 10, there is arranged a fuel addition valve 11 that serves to add a reducing agent in the form of fuel to the exhaust gas at the time when NOx reduction process, SOx poisoning recovery process, or PM regeneration process with respect to the DPNR unit 10 is carried out. In addition, a pressure sensor 12 for detecting the pressure of the exhaust gas (hereinafter also referred to as the exhaust gas pressure) in the vicinity of the fuel addition valve 11 is arranged in the vicinity of the fuel addition valve 11. Further, a flow area changing valve 13 capable of changing a flow area for the exhaust gas is arranged on the exhaust passage 5 at a downstream side of the DPNR unit 10. By changing the degree of opening of the flow area changing valve 13, the flow resistance of the exhaust gas is changed to generate pulsation of the exhaust gas. In this embodiment, the fuel addition valve 11 corresponds to a reducing agent addition unit in the present invention, and the flow area changing valve 13 corresponds to a flow area changing unit in the present invention.

An electronic control unit (ECU) 15 for controlling the internal combustion engine 1 and its exhaust system is provided in conjunction with the internal combustion engine 1 and its exhaust system as constructed in the above-described manner. The ECU 15 serves not only to control operating states or the like of the internal combustion engine 1 in accordance with operating conditions of the internal combustion engine 1 and driver's requirements, but also to perform control on the DPNR unit 10 of the internal combustion engine 1.

The pressure sensor 12 in addition to unillustrated sensors, which are related to controlling the operating states of the internal combustion engine 1, such as an air flow meter, a crank position sensor, an accelerator position sensor and so on, is connected to the ECU 15 through electrical wiring, and the output signals of these sensors are input to the ECU 15. Moreover, unillustrated fuel injection valves, etc., of the internal combustion engine 1 are connected to the ECU 15 through electrical wiring, and in addition, the fuel addition valve 11, the flow area changing valve 13 and so on in this embodiment are also connected to the ECU 15 through electrical wiring so that they are controlled by the ECU 15.

The ECU 15 includes a CPU, a ROM, a RAM and the like, and the ROM stores programs for performing a variety of kinds of control on the internal combustion engine 1, maps storing relevant data ant the like. A PM regeneration control routine in this embodiment to be described below is one of the programs stored in the ROM in the ECU 15.

Here, reference will be made to fuel addition control in which fuel is added from the fuel addition valve 11 to the exhaust gas, and the fuel thus added (hereinafter referred to as the "addition fuel") is supplied therefrom to the DPNR unit 10. When the PM regeneration process for oxidizing and removing the particulate matter (PM) trapped and deposited in the DPNR unit 10 is carried out, the temperature of the DPNR unit 10 is raised up to a high temperature (i.e., a temperature (e.g., 500 degrees C. to 700 degrees C.) at which PM is burned or combusted) due to the heat of reaction generated when the addition fuel is oxidized by the DPNR unit 10.

In addition, in case where the NOx reduction process for reducing the NOx stored in the DPNR unit 10 is performed, the air fuel ratio of the exhaust gas flowing into the DPNR unit 10 is controlled to be lowered up to a rich air fuel ratio. Further, in case where the SOx poisoning recovery process for reducing the SOx stored in the DPNR unit 10 is carried out, the air fuel ratio of the exhaust gas is controlled to be a rich air fuel ratio, and at the same time, the temperature of the DPNR unit 10 is controlled to be maintained at a high temperature (e.g., 600 degrees C. to 650 degrees C.), as in the NOx reduction process.

In case where the control related to each of the above-mentioned processes is executed, the dispersiveness of the addition fuel might be deteriorated because the liquid fuel is added from the fuel addition valve 11 to the exhaust gas. The dispersiveness of the addition fuel might be deteriorated in particular in case where the fuel addition valve 11 is arranged immediately upstream of the DPNR unit 10 due to the constraint of the installation space of the DPNR unit 10 in the exhaust gas purification system or the like, or in case where the addition fuel or the amount of fuel to be added is large.

As a result, in the PM regeneration process and the SOx poisoning recovery process, it has sometimes been difficult to raise the temperature of the entire DPNR unit 10 in a uniform manner. Also, in the NOx reduction process and the SOx poisoning recovery process, it might become difficult to reduce the NOx and SOx stored in the entire DPNR unit 10.

On the other hand, in the NOx reduction process and the SOx poisoning recovery process, the reduction efficiencies of NOx and SOx increase in accordance with the lowering air fuel ratio of the exhaust gas flowing into the DPNR unit 10. Thus, it might be required that an atmosphere of a locally richer air fuel ratio be formed in the DPNR unit 10, thereby making it possible to achieve the complete reduction of NOx and SOx.

Accordingly, in this embodiment, the degree of dispersion of the addition fuel in the exhaust gas is controlled in accordance with the process performed in the DPNR unit 10. That is, the fuel addition control is carried out so as to obtain a desired degree of dispersiveness of the addition fuel. Hereinafter, details of the fuel addition control in this embodiment will be specifically described. Here, note that the degree of dispersion of the addition fuel is a concept to denote the level of dispersiveness of the addition fuel in the exhaust gas, and it means that the higher the degree of dispersion, the more excellent the dispersiveness of the addition fuel is.

When the fuel addition control in this embodiment is to be carried out, the EUC 15 changes in advance the degree of opening Vd of the flow area changing valve 13 (hereinafter referred to as "the valve opening") before the addition of fuel from the fuel addition valve 11. In other words, the valve opening Vd is increased or decreased. As a result, the exhaust gas pressure is caused to vary or fluctuate in a periodic manner to generate a so-called "pulsation of the exhaust gas" due to the changing of the flow resistance of the exhaust gas passing through the exhaust passage 5. In this embodiment, the ECU 15 corresponds to a pulsation generation unit in the present invention.

Figure 2:
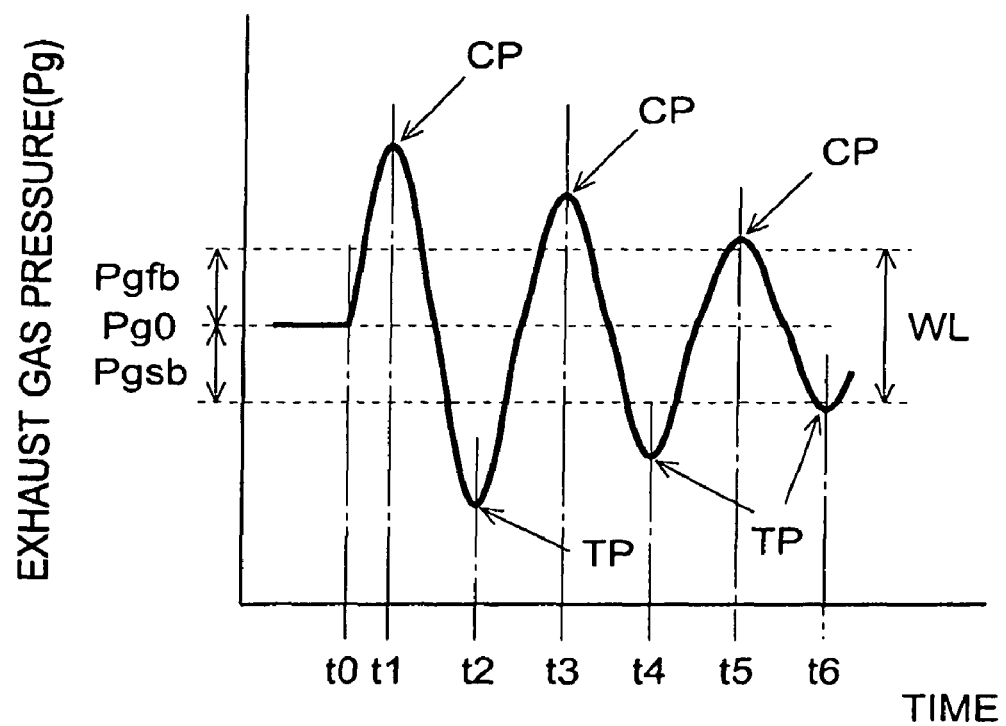
FIG. 2 is a time chart illustrating the time course of exhaust gas pressure Pg in the vicinity of an addition valve at the time when a valve opening Vd in the first embodiment of the present invention is decreased to generate pulsation of an exhaust gas.

Here, FIG. 2 is a time chart illustrating the time course of exhaust gas pressure Pg in the vicinity of the fuel addition valve 11 (hereinafter referred to simply as "the addition valve vicinity exhaust gas pressure") at the time when the valve opening Vd in this first embodiment is decreased to generate the pulsation of the exhaust gas. In this figure, the axis of abscissa denotes time, and the axis of ordinate denotes the addition valve vicinity exhaust gas pressure Pg.

Here, when the valve opening Vd is decreased at time t0, the addition valve vicinity exhaust gas pressure Pg varies while rising and falling in a repeated manner, as shown in FIG. 2. Therefore, a maximum value Pgmax and a minimum value Pgmin appear in a repeated manner in the addition valve vicinity exhaust gas pressure Pg. That is, in this figure, the addition valve vicinity exhaust gas pressure Pg reaches the maximum value Pgmax at points in time t1, t3 and t5, and reaches the minimum value Pgmin at points in time t2, t4 and t6. In addition, a variation width or range WPg(=|Pgmax−Pgmin|) of the addition valve vicinity exhaust gas pressure Pg (e.g., the absolute value of a difference between the maximum value Pgmax and the minimum value Pgmin) decreases with the passage of time.

Here, the density of the exhaust gas becomes higher in accordance with the increasing addition valve vicinity exhaust gas pressure Pg, so if the fuel to be added is supplied to the exhaust gas, for example, at the timing when the density of the exhaust gas becomes high, the collision between the gas molecules of the exhaust gas and the addition fuel will be facilitated. As a result, the atomization of the addition fuel is also facilitated. Accordingly, by supplying the addition fuel to the exhaust gas at the timing at which the addition valve vicinity exhaust gas pressure Pg becomes the maximum value Pgmax, the atomization of the addition fuel can be facilitated, thereby making it possible to increase the degree of dispersion of the addition fuel in the exhaust gas.

On the other hand, when the addition fuel is supplied to the exhaust gas at the timing at which the addition valve vicinity exhaust gas pressure Pg becomes the minimum value Pgmin, the atomization of the addition fuel is suppressed. Thus, the exhaust gas becomes to have portions of higher and lower concentrations of the addition fuel unevenly distributed along a diametral direction of the exhaust passage 5. As a result, a locally deep rich atmosphere can be formed in the DPNR unit 10.

In this embodiment, the degree of dispersion of the addition fuel is controlled by controlling the fuel addition timing at which the addition fuel is supplied or added from the fuel addition valve 11 in accordance with the content of process (e.g., PM regeneration process, NOx reduction process, SOx poisoning recovery process, etc.) performed in the DPNR unit 10. Specifically, the ECU 15 issues an instruction or command to the fuel addition valve 11 at the timing at which the addition valve vicinity exhaust gas pressure Pg becomes the maximum value Pgmax and/or the minimum value Pgmin, so that the addition fuel is supplied from the fuel addition valve 11 to the exhaust gas. In this embodiment, the ECU 15 corresponds to an addition timing control unit in the present invention.

More specifically, either of high dispersion type addition control, low dispersion type addition control, and combined dispersion type addition control, which will be described later, is selected and executed. Here, note that the high dispersion type addition control is to add the addition fuel to the exhaust gas at the timing when the addition valve vicinity exhaust pressure Pg becomes the maximum value Pgmax (arrow CP in FIG. 2). The low dispersion type addition control is to add the addition fuel to the exhaust gas at the timing when the addition valve vicinity exhaust pressure Pg becomes the minimum value Pgmin (arrow TP in FIG. 2). The combined dispersion type addition control is to add the addition fuel to the exhaust gas at the timing when the addition valve vicinity exhaust pressure Pg becomes the maximum value Pgmax and the minimum value Pgmin (arrows CP and TP in FIG. 2).

When PM regeneration process is executed, it is sometimes required that the temperature of the entire DPNR unit 10 be efficiently raised to improve the oxidation efficiency of PM. Accordingly, in case where the PM regeneration process is performed in this embodiment, it is preferable to execute the high dispersion type addition control. According to this, the degree of dispersion of the addition fuel in the exhaust gas is increased, so that the entire DPNR unit 10 can be raised in temperature in a uniform and efficient manner. As a result, the oxidation efficiency of PM can be improved, and fuel mileage according to the PM regeneration process can also be improved. In this embodiment, the PM regeneration process corresponds to temperature raising control in the present invention.

On the other hand, when the NOx reduction process or the SOx poisoning recovery process is carried out, any of the high dispersion type addition control, the low dispersion type addition control, and the combined dispersion type addition control can be selected, and advantages or merits due to the execution of each control can be enjoyed depending upon the condition or situation in which such control is carried out. For example, the degree of dispersion of the addition fuel can be raised by performing the high dispersion type addition control, as stated above, so the reducing agent can be uniformly supplied to the entire area of the DPNR unit 10. Thus, the NOx and SOx stored in the DPNR unit 10 can be reduced in a uniform manner. In other words, the NOx and SOx can be purified more uniformly over the entire DPNR unit 10.

In addition, in case where the reduction efficiencies of NOx and SOx are to be improved locally with respect to the DPNR unit 10, the low dispersion type addition control may be carried out. According to such control, the degree of dispersion of the addition fuel can be suppressed, so a locally deep rich atmosphere can be formed in the DPNR unit 10, thereby making it possible to particularly improve the reduction efficiencies of NOx and SOx in a portion of the DPNR unit 10 corresponding to the locally deep rich atmosphere.

Moreover, the combined dispersion type addition control may be carried out so as to enjoy the advantages or merits of both the high dispersion type addition control and the low dispersion type addition control. That is, there appear the maximum value Pgmax and the minimum value Pgmin in the addition valve vicinity exhaust gas pressure Pg in an alternate manner, so the high dispersion type addition control and the low dispersion type addition control can be carried out alternately. According to such control, the NOx and SOx stored in the entire area of the DPNR unit 10 can be reduced in a uniform manner, and at the same time, more complete purification of the NOx and SOx can be made locally.

Although FIG. 2 exemplifies the case where the valve opening Vd is decreased to generate pulsation of the exhaust gas, the pulsation of the exhaust gas may be generated, for example, by increasing the valve opening Vd. In addition, after the valve opening Vd is changed, various operational modes of the flow area changing valve 13 can be adopted. For example, after the change (decrease or increase) of the valve opening Vd, the valve opening Vd may be maintained as it is or may be returned to the original degree of opening (i.e., the degree of opening before the change). In the latter case, the valve opening Vd will be changed only momentarily so as to generate the pulsation of the exhaust gas. Therefore, from a steady-state point of view, it is possible to generate the pulsation of the exhaust gas in an appropriate manner while maintaining the flow resistance of the exhaust gas before and after the generation of pulsation substantially constant.

Next, reference will be made to addition timing TMad at which the addition fuel is added from the fuel addition valve 11 to the exhaust gas in the course of fuel addition control according to this embodiment. In this embodiment, the addition fuel is intermittently added from the fuel addition valve 11, and the addition timing TMad is decided in such a manner that it is synchronized with timing TMe at which the addition valve vicinity exhaust gas pressure Pg becomes the maximum value Pgmax and/or the minimum value Pgmin (these timing being collectively referred to as "extremum arrival timing").

A specific description will be given below while referring to FIG. 2. In case where the high dispersion type addition control is executed, the addition timing TMad is controlled so as to coincide with time points t1, t3 and t5; in case where the low dispersion type addition control is executed, the addition timing TMad is controlled so as to coincide with time points t2, t4 and t6; and in case where the combined dispersion type addition control is executed, the addition timing TMad is controlled to coincide with time points t1, t2, . . . , t5 and t6. Here, note that the addition fuel need not necessarily be added at all the maximum values Pgmax (or all the minimum values Pgmin, or all the maximum values Pgmax and all the minimum values Pgmin).

Specifically, for example, in case where the high dispersion type addition control (or the low dispersion type addition control) is performed, the addition timing TMad can be decided so as to coincide with time point t1 (time t2) and time point t5 (time t6), whilst no addition fuel is added at time point t3 (time t4). In addition, the addition fuel can be added, for example, at each period or timing at which the addition valve vicinity exhaust gas pressure Pg arrives at the maximum value Pgmax (or the minimum value Pgmin) n times (e.g., n being an arbitrary natural number). Thus, the addition timing TMad can be subjected to various changes within a range not departing from the gist of the present invention.

In this embodiment, the ECU 15 acquires the extremum arrival timing TMe based on the output signal of the pressure sensor 12. Alternatively, the ECU 15 can experimentally obtain beforehand the change of the addition valve vicinity exhaust gas pressure Pg after sending an instruction or command to the flow area changing valve 13 so as to change the valve opening Vd, in each operating state of the internal combustion engine 1. In addition, these relations can be stored in a control map, so that the extremum arrival timing can be acquired referring to the control map.

Thus, it is possible to accurately acquire periodic extremum arrival timing TMe, so the addition timing TMad can be decided to appropriate timing. As a result, the dispersiveness of the addition fuel in the exhaust gas can be controlled in an appropriate manner. Here, note that in this embodiment, the ECU 15, which serves to acquire the extremum arrival timing TMe and decide the addition timing TMad based on the extremum reaching timing TMe thus acquired, corresponds to an addition timing decision unit in the present invention.

The addition timing TMad need not necessarily coincide with the maximum value Pgmax or minimum value Pgmin, but need only to reside in the vicinity of the maximum value Pgmax or the minimum value Pgmin. For example, the range of the "vicinity" may be decided in a range in which the effect of enhancing (or lowering) the degree of dispersion of the addition fuel will not be deteriorated to any excessive extent as compared with the case in which the addition timing TMad is made to coincide with the maximum value Pgmax (or the minimum value Pgmin). With this, a certain margin can be given to the setting range of the addition timing TMad, thereby making it possible to ensure a certain degree of freedom.

On the other hand, a variation range WPg(=|Pgmax−Pgmin|) of the addition valve vicinity exhaust gas pressure decreases with the passage of time, as shown in FIG. 2. After the variation range WPg of the addition valve vicinity exhaust gas pressure has become excessively small, it is difficult to control the degree of dispersion of the addition fuel in an appropriate manner even if the addition fuel is added at the extremum arrival timing TMe. Accordingly, in this embodiment, the fuel addition control is carried out within the range of a period in which the variation range WPg of the addition valve vicinity exhaust gas pressure is maintained equal to or greater than an allowable variation range WL (see FIG. 2).

Here, note that the allowable variation range WL is a lower limit value of the variation range of the addition valve vicinity exhaust gas pressure with which it is determined that the degree of dispersion of addition fuel can be controlled in a satisfactory manner when the addition fuel is added at the extremum arrival timing TMe. Accordingly, it is suppressed that the fuel addition control is performed in spite of the difficulty in controlling the degree of dispersion of the addition fuel. According to such control, the degree of dispersion of the addition fuel can be easily controlled. In this embodiment, the allowable variation range WL corresponds to a predetermined allowable variation range in the present invention.

In addition, when the addition timing TMad is controlled to coincide with the maximum value Pgmax in the high dispersion type addition control (or the combined dispersion type addition control) in this embodiment, the fuel addition control is carried out within the range of a period in which the maximum value Pgmax is maintained higher, by a first reference value Pgfb or more, than an exhaust gas pressure Pg0 immediately before the valve opening Vd is changed (hereinafter referred to as an "immediately before exhaust gas pressure").

Here, note that the first reference value Pgfb is a pressure difference between the immediately before exhaust gas pressure Pg0 and the maximum value Pgmax, and is a lower limit value of the pressure difference that can satisfactorily raise or increase the degree of dispersion of addition fuel when the addition fuel is added at the maximum value Pgmax of the exhaust gas pressure. With the use of the first reference value Pgfb, when addition fuel is added at the maximum value Pgmax, the degree of dispersion of the addition fuel can be increased in an appropriate manner. In this embodiment, the first reference value Pgfb corresponds to a predetermined first threshold in the present invention.

Moreover, when the addition timing TMad is controlled to coincide with the minimum value Pgmin in the low dispersion type addition control (or the combined dispersion type addition control), the fuel addition control is carried out within the range of a period in which the minimum value Pgmin is maintained lower, by a second reference value Pgsb or more, than the immediately before exhaust gas pressure Pg0.

Here, note that the second reference value Pgsb is a pressure difference between the immediately before exhaust gas pressure Pg0 and the minimum value Pgmin, and is a lower limit value of the pressure difference that can satisfactorily lower or decrease the degree of dispersion of addition fuel when the addition fuel is added at the minimum value Pgmin of the exhaust gas pressure. With the use of the second reference value Pgsb, when addition fuel is added at the minimum value Pgmin, the degree of dispersion of the addition fuel can be decreased in an appropriate manner. In this embodiment, the second reference value Pgsb corresponds to a predetermined second threshold in the present invention.

Figure 3:
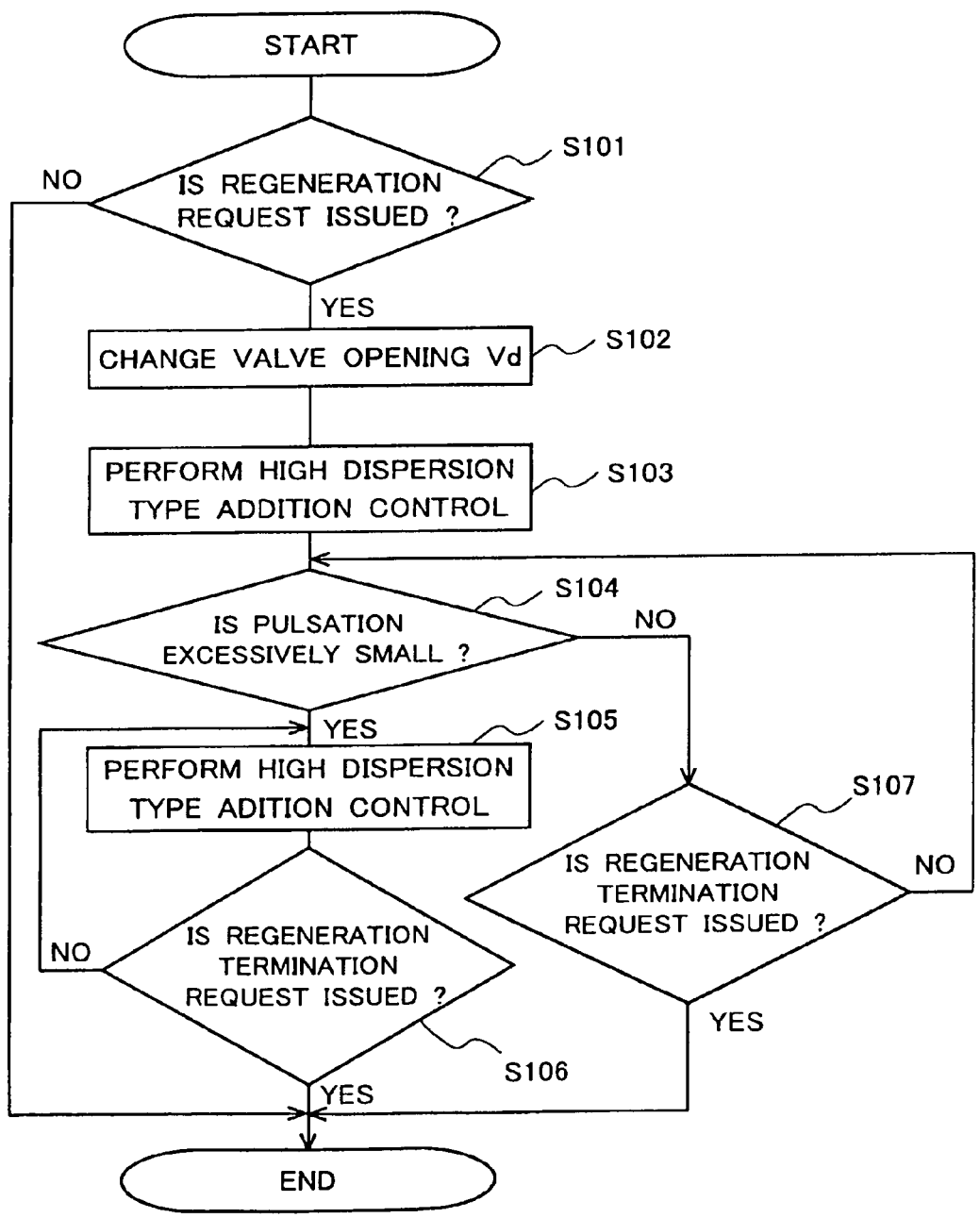
FIG. 3 is a flow chart illustrating a PM regeneration control routine in the first embodiment of the present invention.

Hereinafter, reference will be made to the fuel addition control performed by the ECU 15 while referring to a flow chart of FIG. 3. Here, reference will be made to the fuel addition control when PM regeneration process is performed on the DPNR unit 10. FIG. 3 is a flow chart illustrating a PM regeneration control routine in the first embodiment of the present invention. This routine is a program stored in the ROM in the ECU 15, and is executed at each predetermined time interval during operation of the internal combustion engine 1.

When this routine is executed, first in step S101, it is determined whether a request for regenerating the PM in the DPNR unit 10 has been issued to the DPNR unit 10. For example, such a PM regeneration request is issued by the ECU 15 when an output value of a differential pressure sensor (not shown), which serves to detect a differential pressure between an upstream side and a downstream side of the DPNR unit 10, is larger than a first specified value. This first specified value is a threshold for the differential pressure in the DPNR unit 10 wherein when the above-mentioned differential pressure becomes larger than this value, it is determined that an output function or performance of the internal combustion engine 1 has been decreased by the influence of the PM deposited in the DPNR unit 10. When a positive determination is made in step S101, the control flow proceeds to step S102, whereas when a negative determination is made, this routine is once ended.

In step S102, for the purpose of generating pulsation of an exhaust gas, the ECU 15 issues an instruction or command to the flow area changing valve 13 so that the valve opening Vd is thereby changed. In that case, the valve opening Vd may be increased or decreased.

In step S103, the high dispersion type addition control as mentioned above is executed. Specifically, based on the output value of the pressure sensor 12, the timing is detected at which the addition valve vicinity exhaust gas pressure becomes the maximum value Pgmax, and the addition timing TMad is decided so as to synchronize with the maximum value Pgmax. Then, addition fuel is added from the fuel addition valve 11 to the exhaust gas intermittently at each addition timing TMad.

In step S104, it is determined whether the pulsation of the exhaust gas is an excessively small pulsation state. Here, note that the excessively small pulsation state means a state in which it becomes difficult to efficiently increase the degree of dispersion of the addition fuel even if the high dispersion type addition control is executed, because the pulsation of the exhaust gas becomes excessively small. Specifically, the variation range WPg of the addition valve vicinity exhaust gas pressure is detected based on the output value of the pressure sensor 12, and the excessively small pulsation state is determined according to whether the variation range WPg of the addition valve vicinity exhaust gas pressure becomes smaller than the allowable variation range WL. Alternatively, it can be determined according to whether a value, which is obtained by subtracting the immediately before exhaust gas pressure Pg0 from the maximum value Pgmax most recently detected, becomes smaller than the first reference value Pgfb.

When a positive determination is made in step 104, the control flow proceeds to step S105. In step S105, ordinary addition control is executed. Here, the ordinary addition control means that the addition timing TMad is controlled so as not to synchronize with the extremum arrival timing TMe. In this routine, when the ordinary addition control is executed, addition fuel is supplied without synchronizing the addition timing TMad with the maximum value Pgmax. When the processing of this step ends, the control flow proceeds to step S106.

In step S106, it is determined whether a request for terminating the PM regeneration has been issued. In this step, the PM regeneration termination request is issued when the output value of the unillustrated differential pressure sensor becomes below the second specified value. The second specified value is a threshold for the differential pressure in the DPNR unit 10 wherein when the above-mentioned differential pressure becomes less than this value, it can be determined that the output function or performance of the internal combustion engine 1 has been decreased by the PM deposited in the DPNR unit 10, and the second reference value, being smaller than the first specified value, can be obtained experimentally.

When a positive determination is made in step 106, it is determined that the PM regeneration process in the DPNR unit 10 can be terminated, and this routine is once ended. On the other hand, when a negative determination is made, it is determined that it is necessary to continue the PM regeneration process in the DPNR unit 10, and a return to step S105 is performed. That is, the ordinary addition control as mentioned above is continued, whereby the PM in the DPNR unit 10 is oxidized and removed.

On the other hand, when a negative determination is made in the above-mentioned step S104, it is determined that the high dispersion type addition control can be continued, and the control flow proceeds to step S107. In step S107, it is determined whether a request for terminating the PM regeneration has been issued. The practical content of processing in this step is similar to that in step S106. When a positive determination is made in step S107, the execution of this routine is once terminated. On the other hand, when a negative determination is made, a return to step S104 is carried out, so that the PM regeneration process is continuously performed.

As described above, according to this routine, the atomization of the addition fuel is facilitated by performing the high dispersion type addition control at the time when the PM regeneration process is performed on the DPNR unit 10. Therefore, the degree of dispersion of the addition fuel can be enhanced. As a result, it becomes possible to raise the temperature of the entire DPNR unit 10 in a uniform and efficient manner, whereby the oxidation efficiency of the PM in the DPNR unit 10 can be improved.

In addition, when in step S104 of this routine, it is determined that the pulsation of the exhaust gas is in an excessively small pulsation state, the ordinary addition control is executed in the following step S105 and in the steps thereafter, but pulsation of the exhaust gas may instead be caused to generate freshly. That is, when a positive determination is made in S104, the pulsation of the exhaust gas is generated by controlling the flow area changing valve 13 to change the valve opening Vd thereof again, as in the processing in step S102. According to this, it becomes possible to perform the high dispersion type addition control with an excellent efficiency in raising the temperature of the DPNR unit 10, in a continuous manner.

In this embodiment, the flow area changing valve 13 is disposed at a location downstream of the fuel addition valve 11. This is because the variation range WPg of the addition valve vicinity exhaust gas pressure is increased in view of the fact that the pulsation of the exhaust gas becomes greater at the upstream side than at the downstream side of the flow area changing valve 13. Thus, when the high dispersion type addition control is executed, the degree of dispersion of the addition fuel can be made as high as possible, whereas when the low dispersion type addition control is executed, the degree of dispersion of the addition fuel can be made as low as possible. As a result, the dispersiveness of the addition fuel can be controlled in a more appropriate manner.

Figure 6:
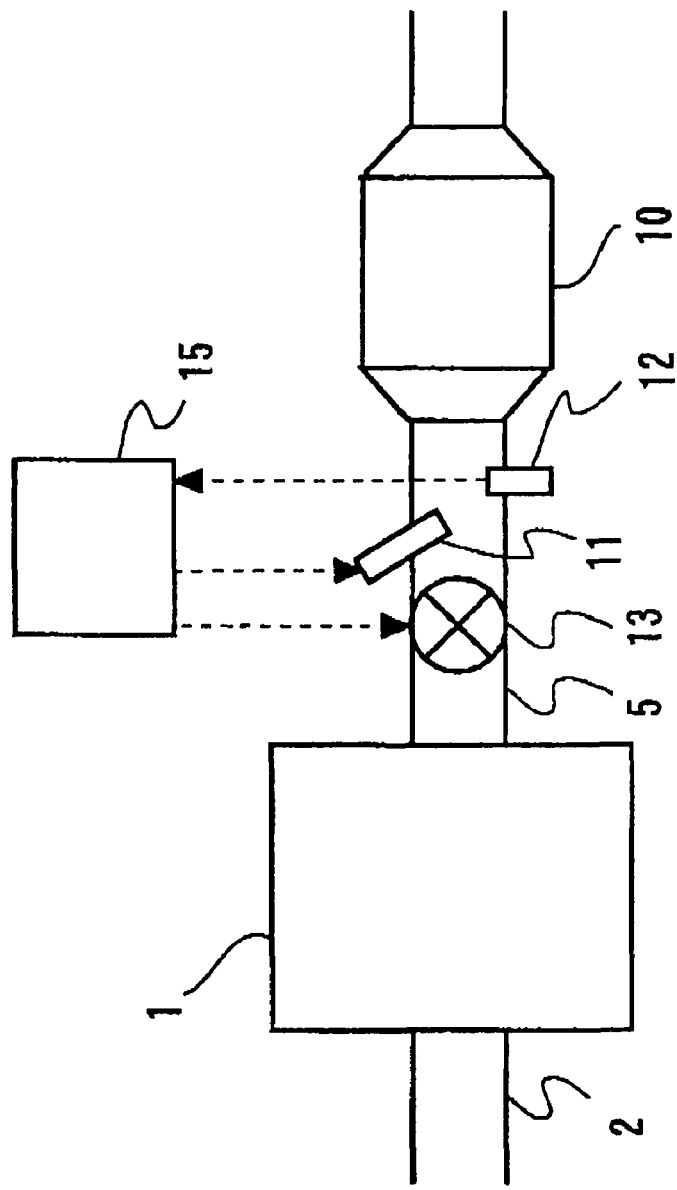
FIG. 6 is a view showing the schematic construction of an internal combustion engine with its intake and exhaust systems and a control system according to a modification of the first embodiment of the present invention.

In this connection, it is to be noted that the present invention can be applied even if the flow area changing valve 13 is not necessarily arranged at the downstream side of the fuel addition valve 11. Even if the flow area changing valve 13 is arranged at the upstream side of the fuel addition valve 11 as illustrated by FIG. 6, the pulsation of the exhaust gas propagates in the exhaust passage 5, so the addition valve vicinity exhaust gas pressure Pg can be varied in an appropriate manner. With such an arrangement, the fuel addition valve 11, the DPNR unit 10, and the flow area changing valve 13 can be arranged with a high degree of freedom.

(Embodiment 2)

Figure 4:
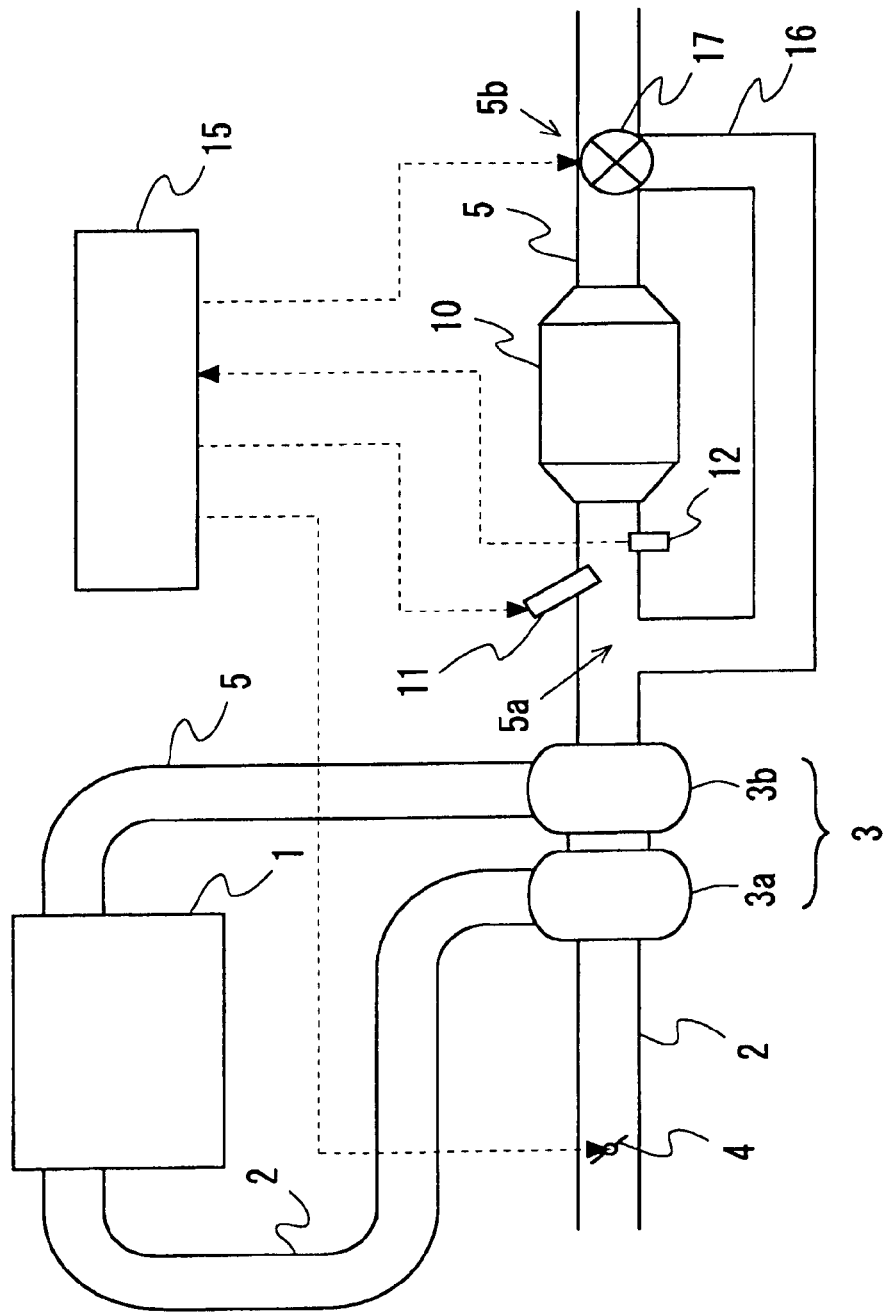
FIG. 4 is a view showing the schematic construction of an internal combustion engine with its intake and exhaust systems and a control system according to a second embodiment of the present invention.

Next, a second embodiment of the present invention will be described below. FIG. 4 is a view showing the schematic construction of an internal combustion engine with its intake and exhaust systems and a control system according to the second embodiment of the present invention. Here, note that the same or like parts or elements in this second embodiment as those in the exhaust gas purification system of the first embodiment are identified by the same symbols while omitting a detailed explanation thereof.

In an exhaust gas purification system in this second embodiment, provision is made for a turbocharger 3 having a compressor housing 3a and a turbine housing 3b arranged on the intake passage 2. A throttle valve 4 is arranged on the intake passage 2 at a location upstream of the compressor housing 3a of the turbocharger 3.

The turbine housing 3b of the turbocharger 3 is arranged on the exhaust passage 5 at a location upstream of the fuel addition valve 11. A bypass passage 16 is branched from the exhaust passage 5 in a branch portion 5a thereof between the turbine housing 3b and the fuel addition valve 11. This bypass passage 16 merges into the exhaust passage 5 at a merging portion 5b disposed at the downstream side of the DPNR unit 10. In the merging portion 5b, there is arranged a change-over valve 17 that is able to control or change over fluid communication between the exhaust passage 5 and the bypass passage 16. That is, in case where the exhaust gas from the internal combustion engine 1 is caused to pass the bypass passage 16, the exhaust gas bypasses the DPNR unit 10. In this second embodiment, the change-over valve 17 corresponds to a flow area changing unit in the present invention.

In this second embodiment, when fuel addition control by means of the fuel addition valve 11 is not carried out, i.e., in the normal operation of the internal combustion engine 1, the exhaust passage 5 and the bypass passage 16 are interrupted or disconnected from each other, whereas when the fuel addition control is performed, the exhaust passage 5 and the bypass passage 16 are made into fluid communication with each other. More specifically, the EUC15 generates an instruction or command to the change-over valve 17 before addition fuel is added from the fuel addition valve 11, so that the exhaust passage 5 and the bypass passage 16 are placed into fluid communication with each other.

As a result, pulsation of the exhaust gas is generated, whereby a periodic pressure variation or fluctuation is caused to occur in the addition valve vicinity exhaust gas pressure Pg. Accordingly, in this second embodiment, too, high dispersion type addition control, low dispersion type addition control, and combined dispersion type addition control are selectively executed by synchronizing the addition timing TMad with the extremum arrival timing TMe.

Figure 5:
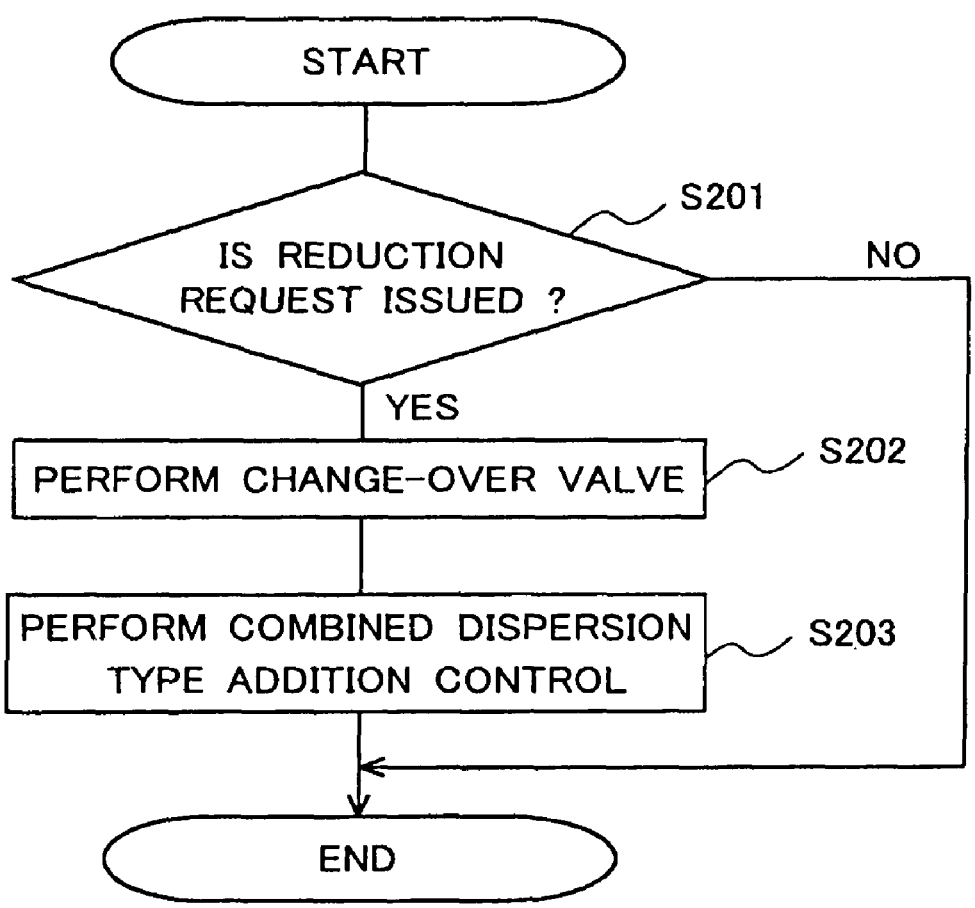
FIG. 5 is a flow chart illustrating a NOx reduction control routine in the second embodiment of the present invention.

In the following, reference will be made to NOx reduction process on the DPNR unit 10 in the second embodiment of the invention based on FIG. 5. FIG. 5 is a flow chart illustrating a NOx reduction control routine in this second embodiment. This routine is a program stored in the ROM in the ECU 15, and is executed at each predetermined time interval during operation of the internal combustion engine 1.

When this routine is executed, first in step S201, it is determined whether a request for reducing the NOx in the DPNR unit 10 has been issued to the DPNR unit 10. The NOx reduction request may be issued, for example, based on an integrated value of an amount of intake air accumulated after the termination of the last NOx reduction process. In addition, the NOx reduction request may instead be issued based on an output value of a NOx sensor (not shown) that is arranged on the exhaust passage 5. When a positive determination is made in step 201, the control flow proceeds to step S202, whereas when a negative determination is made in step S201, the execution of this routine is once ended.

In step S202, the ECU 15 controls the change-over valve 17 so as to generate pulsation of the exhaust gas, whereby the bypass passage 16 and the exhaust passage 5 are placed into fluid communication with each other. That is, the exhaust gas from the internal combustion engine 1 is caused to pass through the bypass passage 16, thereby bypassing the DPNR unit 10. When the change-over valve 17 is controlled in this step, the pulsation of the exhaust gas is generated.

In step S203, the combined dispersion type addition control as mentioned above is executed. Specifically, the timing at which the addition valve vicinity exhaust gas pressure Pg becomes the maximum value Pgmax and the minimum value Pgmin is detected based on the output value of the pressure sensor 12, and the addition timing TMad is decided so as to synchronize with the maximum value Pgmax and the minimum value Pgmin. Then, addition fuel is added from the fuel addition valve 11 to the exhaust gas intermittently at each addition timing TMad. When the processing in this step is terminated, this routine is once ended.

As described above, according to this routine, it is possible to alternately perform the high dispersion type addition control in which the degree of dispersion of the addition fuel is high, and the low dispersion type addition control in which the degree of dispersion of the addition fuel is low. That is, when the degree of dispersion of the addition fuel is high, the NOx stored in the entire area of the DPNR unit 10 can be reduced in a uniform manner, whereas when the degree of dispersion of the addition fuel is low, a locally deep rich atmosphere is formed in the DPNR unit 10, so the complete purification of the NOx in that portion can be made.

Here, note that in this routine, the combined dispersion type addition control is executed to perform the NOx reduction process, but low dispersion type addition control may instead be carried out for example. In that case, in step S203 in the above-mentioned routine, low dispersion type addition control should only be performed. Although in this second embodiment, the NOx reduction process on the DPNR unit 10 has been described, the above-mentioned control routine can also be applied even in case where SOx poisoning recovery process is performed.

In addition, the exhaust gas purification system in this second embodiment is provided with the turbocharger 3, and the pressure state of the exhaust gas is greatly different between the upstream side and the downstream side of the turbine housing 3b. In this case, should the fuel addition valve be disposed at a location upstream of the turbine housing 3b, it might sometimes become difficult to cause the addition valve vicinity exhaust gas pressure Pg to vary in an appropriate manner even if the pulsation of the exhaust gas is generated at the downstream side of the turbine housing 3b. Accordingly, in case where the present invention is applied to the exhaust gas purification system provided with the turbocharger 3, it is preferable that the fuel addition valve 11 be disposed at the downstream side of the turbine housing 3b, as in the system construction according to this second embodiment.

While the invention has been described in terms of preferred embodiments, those skilled in the art will recognize that the invention can be practiced with modifications within the spirit and scope of the appended claims.

Industrial Applicability

According to the present invention, it is possible to control, with a simple construction, the degree of dispersion of a reducing agent added to an exhaust gas flowing into an exhaust gas purification apparatus when reducing agent addition control for adding the reducing agent to the exhaust gas flowing into the exhaust gas purification apparatus is performed.

The invention claimed is:

1. An exhaust gas purification system for an internal combustion engine comprising: an exhaust gas purification apparatus that is arranged on an exhaust passage of said internal combustion engine for purifying an exhaust gas passing through said exhaust passage, a reducing agent addition unit that is arranged on said exhaust passage at a location upstream of said exhaust gas purification apparatus for adding a reducing agent to the exhaust gas passing through said exhaust gas purification apparatus, a flow area changing unit that is arranged on said exhaust passage for changing the flow area of the exhaust gas, a pulsation generation unit that generates pulsation of the exhaust gas by changing said flow area by means of said flow area changing unit before said reducing agent addition unit adds the reducing agent to the exhaust gas, and an addition timing control unit that controls said reducing agent addition unit so as to add the reducing agent at timing at which the exhaust gas pressure in the vicinity of said reducing agent addition unit, being varied due to said pulsation of the exhaust gas, becomes in the vicinity of a maximum value and/or a minimum value, wherein said addition timing control unit serves to control said reducing agent addition unit so as to add the reducing agent within the range of a period in which a variation range of said exhaust gas pressure is maintained equal to or greater than a predetermined allowable variation range.

2. The exhaust gas purification system for an internal combustion engine as set forth in claim 1, wherein when controlling said reducing agent addition unit so as to add the reducing agent to said exhaust gas at timing at which said exhaust gas pressure becomes in the vicinity of a minimum value, said addition timing control unit serves to add the reducing agent within the range of a period in which said minimum value is maintained lower, by a second threshold or more, than said exhaust gas pressure immediately before said flow area is changed.

3. The exhaust gas purification system for an internal combustion engine as set forth in claim 1, wherein said addition timing control unit serves to control said reducing agent addition unit so as to intermittently add the reducing agent, and at the same time to synchronize addition timing, at which the reducing agent is added by said reducing agent addition unit, with timing at which said exhaust gas pressure becomes in the vicinity of said maximum value and/or said minimum value.

4. The exhaust gas purification system for an internal combustion engine as set forth in claim 1, further comprising: an addition timing decision unit that acquires extremum arrival timing at which said exhaust gas pressure becomes in the vicinity of said maximum value and/or said minimum value, and at the same time decides, based on said extremum arrival timing thus acquired, addition timing at which said reducing agent addition unit is controlled to add the reducing agent by means of said addition timing control unit.

5. The exhaust gas purification system for an internal combustion engine as set forth in claim 1, wherein when controlling said reducing agent addition unit so as to add the reducing agent to said exhaust gas at timing at which said exhaust gas pressure becomes in the vicinity of a maximum value, said addition timing control unit serves to add the reducing agent within the range of a period in which said maximum value is maintained higher, by a first threshold or more, than said exhaust gas pressure immediately before said flow area is changed.

6. The exhaust gas purification system for an internal combustion engine as set forth in claim 5, wherein when controlling said reducing agent addition unit so as to add the reducing agent to said exhaust gas at timing at which said exhaust gas pressure becomes in the vicinity of a minimum value, said addition timing control unit serves to add the reducing agent within the range of a period in which said minimum value is maintained lower, by a second threshold or more, than said exhaust gas pressure immediately before said flow area is changed.

7. An exhaust gas purification system for an internal combustion engine comprising: an exhaust gas purification apparatus that is arranged on an exhaust passage of said internal combustion engine for purifying an exhaust gas passing through said exhaust passage, a reducing agent addition unit that is arranged on said exhaust passage at a location upstream of said exhaust gas purification apparatus for adding a reducing agent to the exhaust gas passing through said exhaust gas purification apparatus, a flow area changing unit that is arranged on said exhaust passage for changing the flow area of the exhaust gas, a pulsation generation unit that generates pulsation of the exhaust gas by changing said flow area by means of said flow area changing unit before said reducing agent addition unit adds the reducing agent to the exhaust gas, and an addition timing control unit that controls said reducing agent addition unit so as to add the reducing agent at timing at which the exhaust gas pressure in the vicinity of said reducing agent addition unit, being varied due to said pulsation of the exhaust gas, becomes in the vicinity of a maximum value and/or a minimum value, wherein when controlling said reducing agent addition unit so as to add the reducing agent to said exhaust gas at timing at which said exhaust gas pressure becomes in the vicinity of a maximum value, said addition timing control unit serves to add the reducing agent within the range of a period in which said maximum value is maintained higher, by a first threshold or more, than said exhaust gas pressure immediately before said flow area is changed.

8. The exhaust gas purification system for an internal combustion engine as set forth in claim 7, wherein when controlling said reducing agent addition unit so as to add the reducing agent to said exhaust gas at timing at which said exhaust gas pressure becomes in the vicinity of a minimum value, said addition timing control unit serves to add the reducing agent within the range of a period in which said minimum value is maintained lower, by a second threshold or more, than said exhaust gas pressure immediately before said flow area is changed.

9. The exhaust gas purification system for an internal combustion engine as set forth in claim 7, wherein said addition timing control unit serves to control said reducing agent addition unit so as to intermittently add the reducing agent, and at the same time to synchronize addition timing, at which the reducing agent is added by said reducing agent addition unit, with timing at which said exhaust gas pressure becomes in the vicinity of said maximum value and/or said minimum value.

10. The exhaust gas purification system for an internal combustion engine as set forth in claim 7, further comprising: an addition timing decision unit that acquires extremum arrival timing at which said exhaust gas pressure becomes in the vicinity of said maximum value and/or said minimum value, and at the same time decides, based on said extremum arrival timing thus acquired, addition timing at which said reducing agent addition unit is controlled to add the reducing agent by means of said addition timing control unit.

11. An exhaust gas purification system for an internal combustion engine comprising: an exhaust gas purification apparatus that is arranged on an exhaust passage of said internal combustion engine for purifying an exhaust gas passing through said exhaust passage, a reducing agent addition unit that is arranged on said exhaust passage at a location upstream of said exhaust gas purification apparatus for adding a reducing agent to the exhaust gas passing through said exhaust gas purification apparatus, a flow area changing unit that is arranged on said exhaust passage for changing the flow area of the exhaust gas, a pulsation generation unit that generates pulsation of the exhaust gas by changing said flow area by means of said flow area changing unit before said reducing agent addition unit adds the reducing agent to the exhaust gas, and an addition timing control unit that controls said reducing agent addition unit so as to add the reducing agent at timing at which the exhaust gas pressure in the vicinity of said reducing agent addition unit, being varied due to said pulsation of the exhaust gas, becomes in the vicinity of a maximum value and/or a minimum value, wherein when controlling said reducing agent addition unit so as to add the reducing agent to said exhaust gas at timing at which said exhaust gas pressure becomes in the vicinity of a minimum value, said addition timing control unit serves to add the reducing agent within the range of a period in which said minimum value is maintained lower, by a second threshold or more, than said exhaust gas pressure immediately before said flow area is changed.

12. The exhaust gas purification system for an internal combustion engine as set forth in claim 11, wherein said addition timing control unit serves to control said reducing agent addition unit so as to intermittently add the reducing agent, and at the same time to synchronize addition timing, at which the reducing agent is added by said reducing agent addition unit, with timing at which said exhaust gas pressure becomes in the vicinity of said maximum value and/or said minimum value.

13. The exhaust gas purification system for an internal combustion engine as set forth in claim 11, further comprising: an addition timing decision unit that acquires extremum arrival timing at which said exhaust gas pressure becomes in the vicinity of said maximum value and/or said minimum value, and at the same time decides, based on said extremum arrival timing thus acquired, addition timing at which said reducing agent addition unit is controlled to add the reducing agent by means of said addition timing control unit.

* * * * *